(12) United States Patent
Dickstein et al.

(10) Patent No.: US 7,418,414 B2
(45) Date of Patent: Aug. 26, 2008

(54) SYSTEM AND METHOD TO ORGANIZE AND MANAGE CORPORATE CAPITALIZATION AND SECURITIES

(75) Inventors: Peter M. Dickstein, San Francisco, CA (US); Arlene Schapira, Milpitas, CA (US); Morgan J. Cohen, Mountain View, CA (US)

(73) Assignee: Eprosper, Redwood City, CA (US)

( * ) Notice: Subject to any disclaimer, the term of this patent is extended or adjusted under 35 U.S.C. 154(b) by 834 days.

(21) Appl. No.: 09/752,650

(22) Filed: Dec. 29, 2000

(65) Prior Publication Data

US 2002/0087373 A1    Jul. 4, 2002

(51) Int. Cl.
*G06Q 40/00*    (2006.01)

(52) U.S. Cl. ...................... 705/35; 705/36 R
(58) Field of Classification Search ............. 705/35–37
See application file for complete search history.

(56) References Cited

U.S. PATENT DOCUMENTS

| | | | |
|---|---|---|---|
| 5,671,363 A | | 9/1997 | Cristofich et al. |
| 5,819,271 A | * | 10/1998 | Mahoney et al. ............ 707/9 |
| 6,078,924 A | * | 6/2000 | Ainsbury et al. ........... 707/101 |
| 6,122,635 A | * | 9/2000 | Burakoff et al. ........... 707/102 |
| 6,374,270 B1 | * | 4/2002 | Maimon et al. ........... 715/500 |
| 6,411,939 B1 | * | 6/2002 | Parsons .................. 705/35 |
| 6,442,533 B1 | * | 8/2002 | Hinkle ................... 705/35 |
| 6,513,019 B2 | * | 1/2003 | Lewis .................... 705/35 |
| 6,629,082 B1 | * | 9/2003 | Hambrecht et al. ......... 705/37 |
| 2001/0034680 A1 | * | 10/2001 | Purcell .................. 705/35 |
| 2001/0056387 A1 | * | 12/2001 | Magary et al. ............ 705/30 |
| 2002/0019798 A1 | * | 2/2002 | Gajendragadkar .......... 705/37 |
| 2003/0149646 A1 | * | 8/2003 | Chen et al. .............. 705/35 |
| 2004/0098666 A1 | * | 5/2004 | Smith, II ............... 715/501.1 |

OTHER PUBLICATIONS

SEC EDGAR Submission 0001032210-99-001375, 1999, 87 pgs.*
Final Rule: Rile 70 1—Exempt Offerings Pursuant to Compensatory Arrangements, Apr. 7, 1999.*
oncle Sample Contracts, dated 1996 and 1998, 9 pgs.*
Securities and Exchange Commission,Important Information About Edgar, Jan. 26, 1999. 1 pg.*
Securities and Exchange Commission,General Information on Th EDGAR Database, Mar. 18, 1999, 3 pgs..*
Microsoft 1999 Annual Report, 33 pgs.*
SEC Form 10-K filing by eBay, Inc. 0001012870-99-000878, dated Mar. 30, 1999, 96 pages.*
SEC Form S-1 filing by eBay, Inc. 0001012870-98-001814, dated Jul. 16, 1998, 510 pages.*
Downes, L. et al, Dictionary of Finance and Investment Terms, fifth Ed. 1998, pp. 57, 659.*

(Continued)

*Primary Examiner*—Hani M. Kazimi
*Assistant Examiner*—Daniel Kesack
(74) *Attorney, Agent, or Firm*—Morrison & Foerster LLP

(57) ABSTRACT

The present invention is a system and method for organizing and managing corporate capitalization and securities. A database tracks the complete capitalization, not just the administration of options. For a privately-held company, if the holder of a derivative security, such as a warrant, decides to exercise that derivative security, then the system will issue the holder shares of stock related to that security. The company can access and update the data in the database via a web connection. The data can also be used to perform analyses and determine the effect on the capitalization structure of future actions.

40 Claims, 11 Drawing Sheets

OTHER PUBLICATIONS

"CCH Goes Global With Daily Capital Changes Coverage", CCH Incorporated, Feb. 1, 2000, http://www.cch.com/press/news/2000/2000020101s.asp, 3 pages.

"ADR/Global Capital Changes Historical on the Internet", Copyright 2000, http://onlinestore.cch.com/productDetail.asp?SessionID=1939746&ProductID=1115&Campa, 2 pages.

"Capital Changes Daily on the Internet", Copyright 2000, http://onlinestore.cch.com/productDetail.asp?SessionID=1939746&ProductID=775&Campai., 2 pages.

"Fair Market Value—Getting it Right", CAP Exchange News & Information about CCH Capital Changes, CCH Incorporated, Issue 1, Spring 2001, 4 pages.

"Corporate Focus—Information Management for Corporate Attorneys", Law Office Technology Solutions, May 1997, vol. 1, Issue 4, Altman Weil Pensa, 1 page.

Overview of Corporate Focus—Tracking Corporate, Stock and Options, http://www.twostep.com/fact.html., 5 pages, Nov. 13, 2002.

* cited by examiner

| Date | Payment Type | Amount Paid | No. of Shares | Amount Due |
|---|---|---|---|---|
| | Cash | | | |
| | Promissory note principal | | | |
| | Promissory note interest | | | |
| | Conversion of CPN prinicipal | | | |
| | Conversion of CPN interest | | | |
| | Gift | | | |
| | Services rendered | | | |
| | Debit conversion | | | |
| | Transer of technology and/or property | | | |
| | Stock | | | |
| | Net exercise | | | |
| | Other | | | |
| | | | | |
| | TOTAL | .00 | 0 | .00 |

Refund Information
Amount

Promissory Note

Basic | Cancel History

Date / /   Principal Amount
Interest Rate   Compounding
Maturity Date / /

Figure 6

SYSTEM AND METHOD TO ORGANIZE AND MANAGE CORPORATE CAPITALIZATION AND SECURITIES

FIELD OF THE INVENTION

The field of the invention relates to computer networking, e-commerce, and on-line services. More specifically, the present invention is directed to a method and an apparatus for administrating all components of the capitalization structure for a company.

BACKGROUND OF THE INVENTION

Corporate securities administration traditionally deals exclusively with tracking the allocation, granting, exercising, redemption, conversion, and termination of securities by a company. Using a computer and a variety of software solutions, a securities administrator can track all corporate securities authorized and issued. The owner, value, and status of the security can be tracked as well. Typically, a company wishing to authorize, issue, transfer or record securities uses: 1) a securities law firm to advise, prepare, and draft the necessary documents and assure regulatory compliance, 2) an accounting firm to assess and record the impact of the securities distribution on the corporate balance sheet and tax statements, 3) an outside service provider or transfer agent to actually issue stock certificates to the recipients, and 4) a brokerage firm to facilitate the sale of publicly traded securities. This conventional process is cumbersome and error-prone. Synchronizing, communicating, and validating the work done by in-house company staff and outside firms is very difficult, even for the simplest securities transaction. In typical situations, last minute changes to the securities transaction are common. Sometimes, the securities transaction may not be properly validated against the company's capitalization structure. The problem can be worse in privately-held companies, which commonly do not have qualified resources to properly administer their securities transactions. For example, the securities administrator could be instructed by a company executive to grant a number of stock options which could exceed what was authorized by the company's capitalization structure.

What is needed is a system and method to administer a company's securities administrator functions within the context of the company's capitalization structure.

SUMMARY OF THE INVENTION

The present invention is a system and method for organizing and managing corporate capitalization and securities. A database tracks the complete capitalization, not just the administration of options. For a privately-held company, if the holder of a derivative security, such as a warrant, decides to exercise that derivative security, then the system will issue the holder shares of stock related to that security. The company can access and update the data in the database via a web connection. The data can also be used to perform analyses based on actual and hypothetical scenarios and determine their effect on a company's capitalization structure.

BRIEF DESCRIPTION OF THE DRAWINGS

The present invention is illustrated by way of example and not limitation in the figures of the accompanying drawings, in which

FIG. 4 is a user interface for inputting data regarding option grants.

FIG. 5 is a customized web user interface.

FIG. 6 is a payment screen.

DETAILED DESCRIPTION OF THE PREFERRED EMBODIMENT

An Internet-based system and method for organizing and managing corporate capitalization and securities is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figure 1:
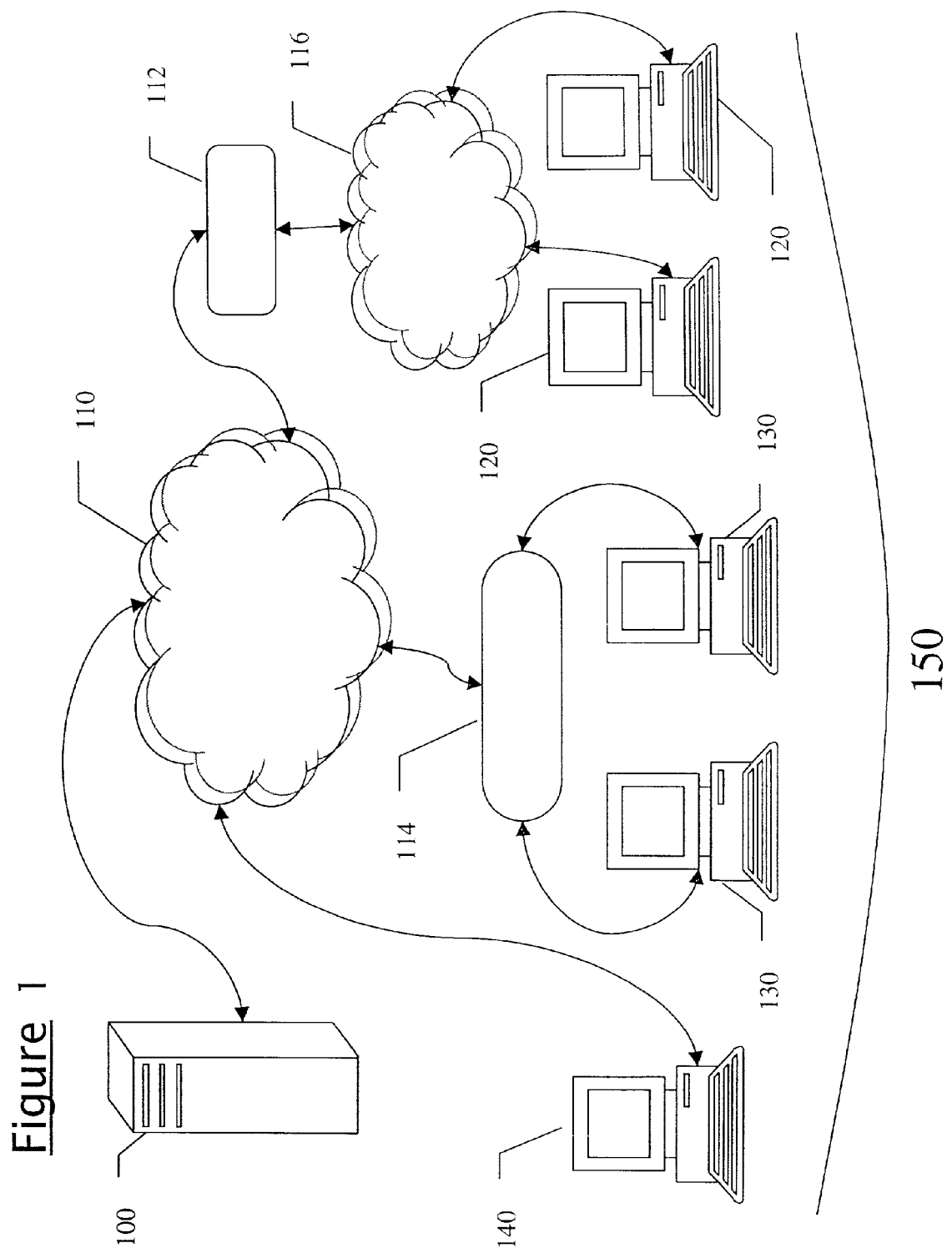
FIG. 1 illustrates a prior art computer network topology and typical network in which the present invention operates.

Referring now to FIG. 1, a diagram illustrates the network environment in which the present invention operates. In this conventional network architecture, a server computer system 100 is coupled to a wide-area network 110. Wide-area network 110 includes the Internet, or other proprietary networks including America On-Line™, CompuServe™, Microsoft Network™, and Prodigy™, each of which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the World-Wide Web (WWW) portion of the Internet is used for wide-area network 110. Using the HTTP or HTTPS protocol and the HTML or XML coding language across wide-area network 110, web server 100 may communicate across the World-Wide Web with clients 150. In this configuration, clients 150 use a client application program known as a web browser such as the Netscape™ Navigator™ formerly published by Netscape Corporation of Mountain View, Calif., the Internet Explorer™ published by Microsoft Corporation of Redmond, Wash., the user interface of America On-Line™, or the web browser or HTML/XML translator of any other well-known supplier. Using such conventional browsers and the World-Wide Web, clients 150 may access image, graphical, and textual data provided by web server 100 or run Web application software. Conventional means exist by which clients 150 may supply information to web server 100 through the World-Wide Web 110 and the web server 100 may return processed data to clients 150.

Figure 2A:
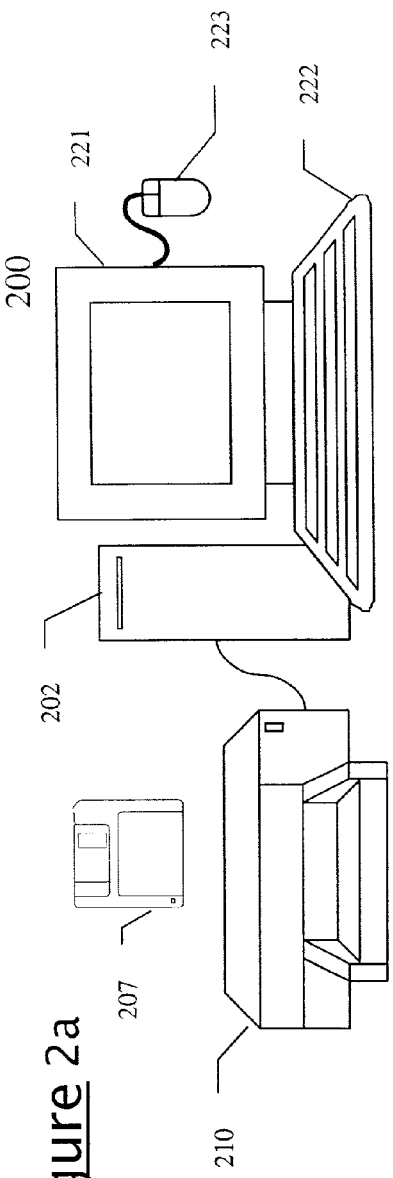
FIGS. 2a-b illustrate the prior art architecture of a conventional computer system useable with the present invention.
Figure 2B:
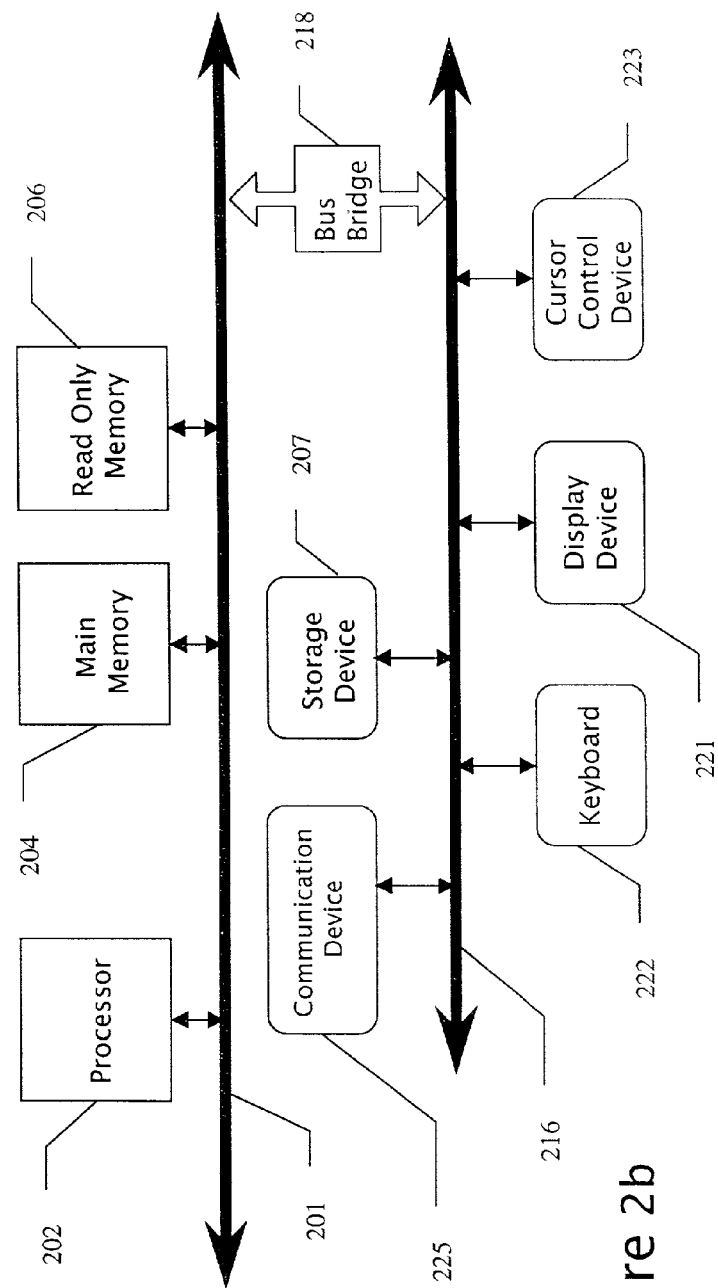

Having briefly described one embodiment of the network environment in which the present invention operates, FIG. 2 illustrates an example of a computer system 200 illustrating an exemplary client 150 or server 100 computer system in which the features of the present invention may be implemented. Computer system 200 is comprised of a bus or other communications means 201 for communicating information, and a processing means such as processor 202 coupled with bus 201 for processing information. Computer system 200 further comprises a random access memory (RAM) or other dynamic storage device 204 (commonly referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

An optional data storage device 207 such as a magnetic disk or optical disk and its corresponding drive may also be coupled to computer system 200 for storing information and instructions. Computer system 200 can also be coupled via the first bus 201 connected to a second bus 216 via a bus bridge 218 to a display device 221, such as a cathode ray tube (CRT) or a liquid crystal display (LCD), for displaying information to a computer user. For example, image, textual, or graphical depictions of securities and/or capitalization data and other types of image, graphical, or textual information may be presented to the user on display device 221. Typically, an alphanumeric input device 222, including alphanumeric and other keys is coupled to bus 201 for communicating information and/or command selections to processor 202. Another type of user input device is cursor control device 223, such as a conventional mouse, trackball, or other type of cursor direction keys for communicating direction information and command selection to processor 202 and for controlling cursor movement on display device 221.

Alternatively, the client 150 can be implemented as a network computer or thin client device, such as the WebTV Networks™ Internet terminal or the Oracle™ NC. Client 150 may also be a laptop, handheld or palm-held computing device, such as the PalmPilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 225 is also coupled to bus 216 for accessing remote computers or servers, such as web server 100, or other servers via the Internet, for example. The communication device 225 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of the present invention includes software, information processing hardware, and various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communication systems.

The present invention is a system and method for organizing and managing corporate capitalization, securities, and their exemptions. In one embodiment of the current computer based business plan, a database is maintained to catalog the capitalization structure of a company. A company's capitalization structure describes the way the company has been funded and the company's associated ownership structure. Important activities connected with capitalizing a company includes the issuance of shares and the granting of options to purchase the company's own stock. A company must be able to clearly and accurately define the shares authorized for issuance, under which federal and state exemptions they can be issued, the owners of the shares or options, and the value for any given shares. In one embodiment of the present invention, a capitalization structure maintained in the database includes information about outstanding shares, types of shares available, number of shares available, derivative securities available, outstanding derivative securities, and types of derivative securities available. It will be apparent to one of ordinary skill in the act that other related information can be similarly retained.

To fully understand the nature of the invention, the terms used in capitalization should be defined. A security is partial ownership of a company or the right to purchase partial ownership of a company. Examples of securities include, but are not limited to, stock, restricted stock, stock purchase rights, options, warrants, and convertible promissory notes. Other than stock and restricted stock, these types of securities are generally referred to as derivative securities. A restricted stock is a stock subject to terms and conditions between the stockholder and the company, limiting the transferability of the stock. A stock purchase right (SPR) is an agreement between a company and a person or entity entitling such person or entity to purchase a certain number of shares of stock at a specified price. An option is an agreement between a company and another party entitling the party to buy the company's stock at a certain price, called the exercise price.

Companies can grant stock options in two basic forms: non-qualified stock options (NSO) and incentive stock options (ISO). A company can grant an ISO only to its employees. A company can grant an NSO to whomever it chooses. A convertible promissory note (CPN) is a security entitling its holder to either a sum of shares of a company's stock equal in value to a certain amount of money, or the repayment of the principal value of the note and the interest accrued thereon in cash. A warrant is another type of derivative security agreement between a company and another party (typically not employed by the company) entitling the party to buy the company's stock within a specified time frame at a certain price.

Figure 3:
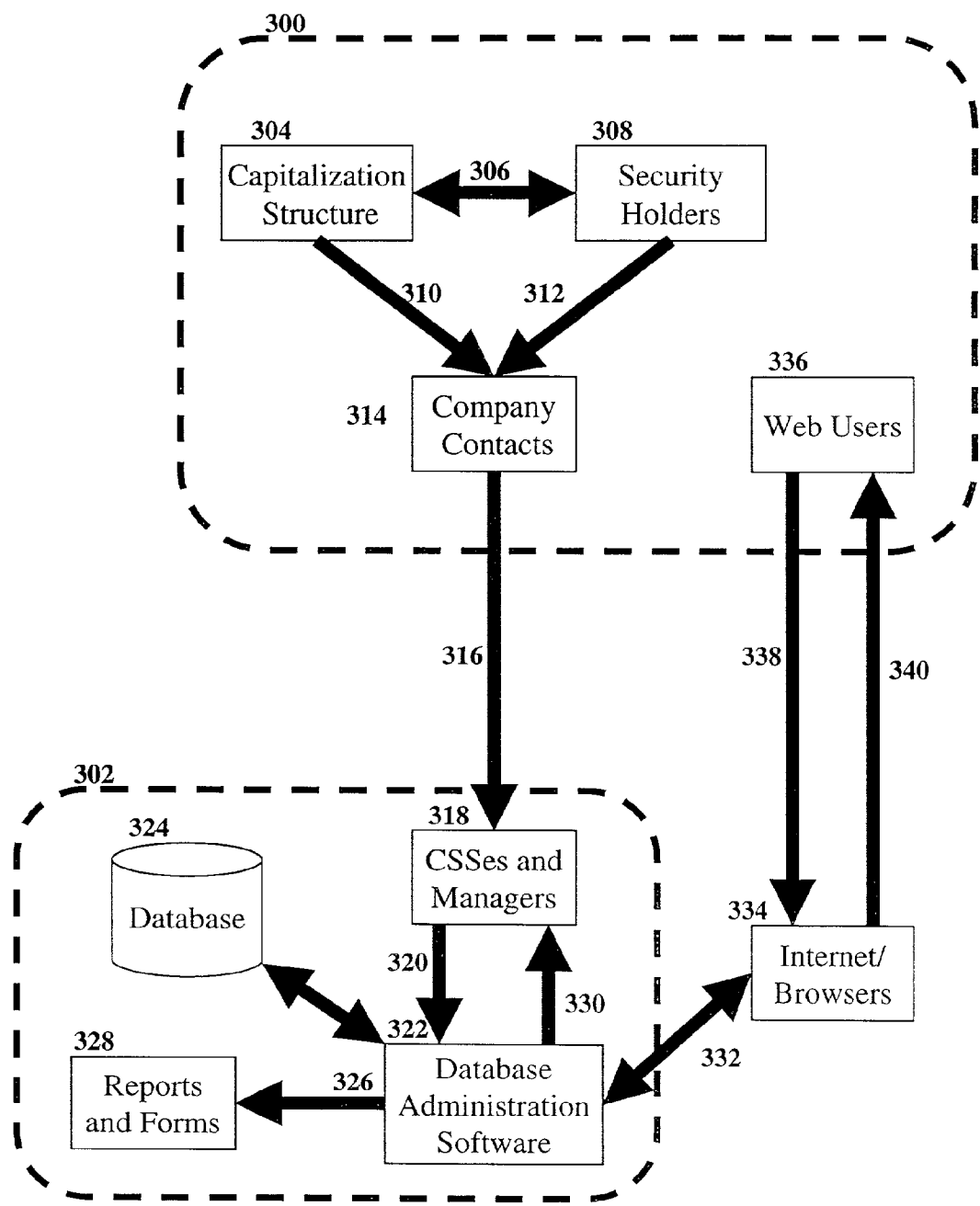
FIG. 3 illustrates the infrastructure used in the present invention.

The overall architecture of one embodiment of the system used with the present invention is illustrated in FIG. 3. In one embodiment, a company 300 would use the database administration system 302 of the present invention to manage the company's capitalization structure 304. The database administration system 302, also called a service provider, could be implemented as a web enabled or application service provider (ASP) database system. The database administration system 302 can be used to view or modify a capitalization structure. Changes to the capitalization structure 306, in the form of issuance of securities for example, would be communicated to the security holders 308. Information related to changes to the capitalization structure 310 and information related to changes 312 in the relationship between security holders 308 and the company would be reported to company contacts 314 within the company. These changes and any other company events affecting capitalization structure 304 would be reported to the database administration system 302 via company contacts 314.

The information related to all company events 316 is received within the database administration system 302 by the client services specialists (CSS) and managers 318. The specialists and managers then enter the company event data 320 into the database administration software 322, which stores the information into the database 324. This database administration software 322 generates 326 the reports and forms 328 processed by the software 322 during data analysis. The specialists and managers 318 can then view or print 330 these reports 328.

In an alternative embodiment, the system software 322 creates an HTML link 332 to the Internet 334. Web users 336 within the company 300, which can include security holders and company contacts, can then enter tentative option grants and update related information 338 via the Internet 334. In return, the web users 336 from the company 300 can view and print 340 the reports 328 generated by the system software 322. Web access conveniently makes the information in the database, as well as the projections based on that information, accessible to a wide range of agents and outside users authorized by the company.

Figures 4, 5:
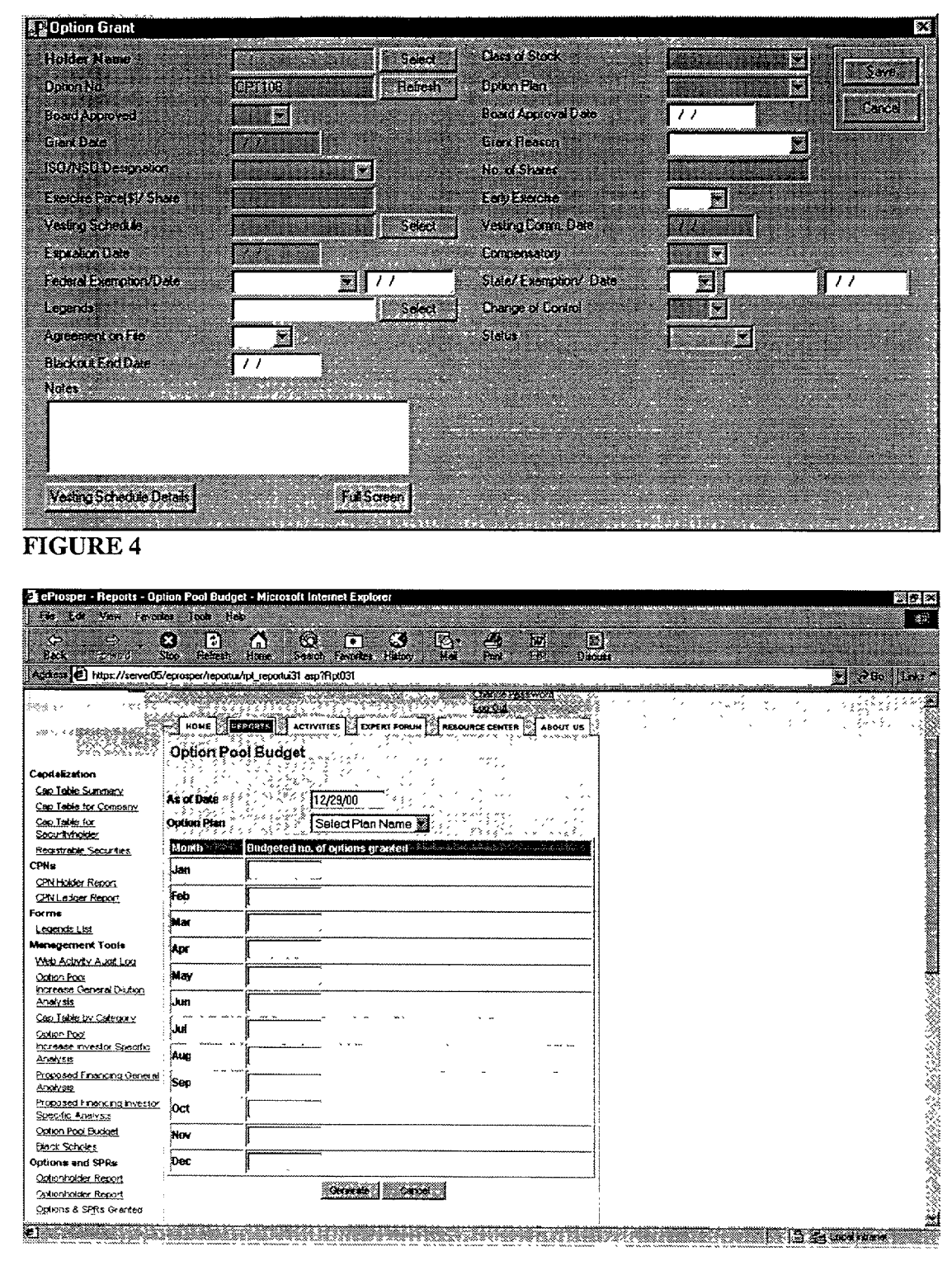

In one embodiment, the related company 300 would update this data (316 or 338) as the need arises. The company or agents of the company, such as directors, executives or human resources staff, use a web page interface 334, such as the interface illustrated in FIG. 4, to alter the information maintained by database administration software 322. In one embodiment, the agents of the company are categorized based on the company's needs, and the web page interface is customized to suit the category of the agent within the company, such as FIG. 5. Examples of these categories would be a board member or a human resources director. In an alternative embodiment, the previously mentioned agents of the company would report the changes to the service provider, who would then make the required changes. In a further embodiment, an agent of the company could enter changes to the securities in the system via the web site that require, if a level of expertise is needed, final approval from the CSS assigned to the company. In an alternate embodiment, a stakeholder can access the information stored in the database via the web page. A stakeholder is a person or agent who conducts business with the company.

In one embodiment, the customized user interfaces include a payments screen to track payments made for stock. The payment screen, shown in FIG. 6, gives the user more choices as to payment types, thus reflecting the various methods of capitalizing a company. The screen also permits the user to track the payment particulars. For example, payments that are made via promissory note require that certain information be maintained, such as the note's principal amount, interest rate, maturity date, and whether or not the interest compounds. Upon cancellation of a note, the system allows the user to input the information relating to the cancellation such as date, amount cancelled and cancellation reason.

Figure 7:
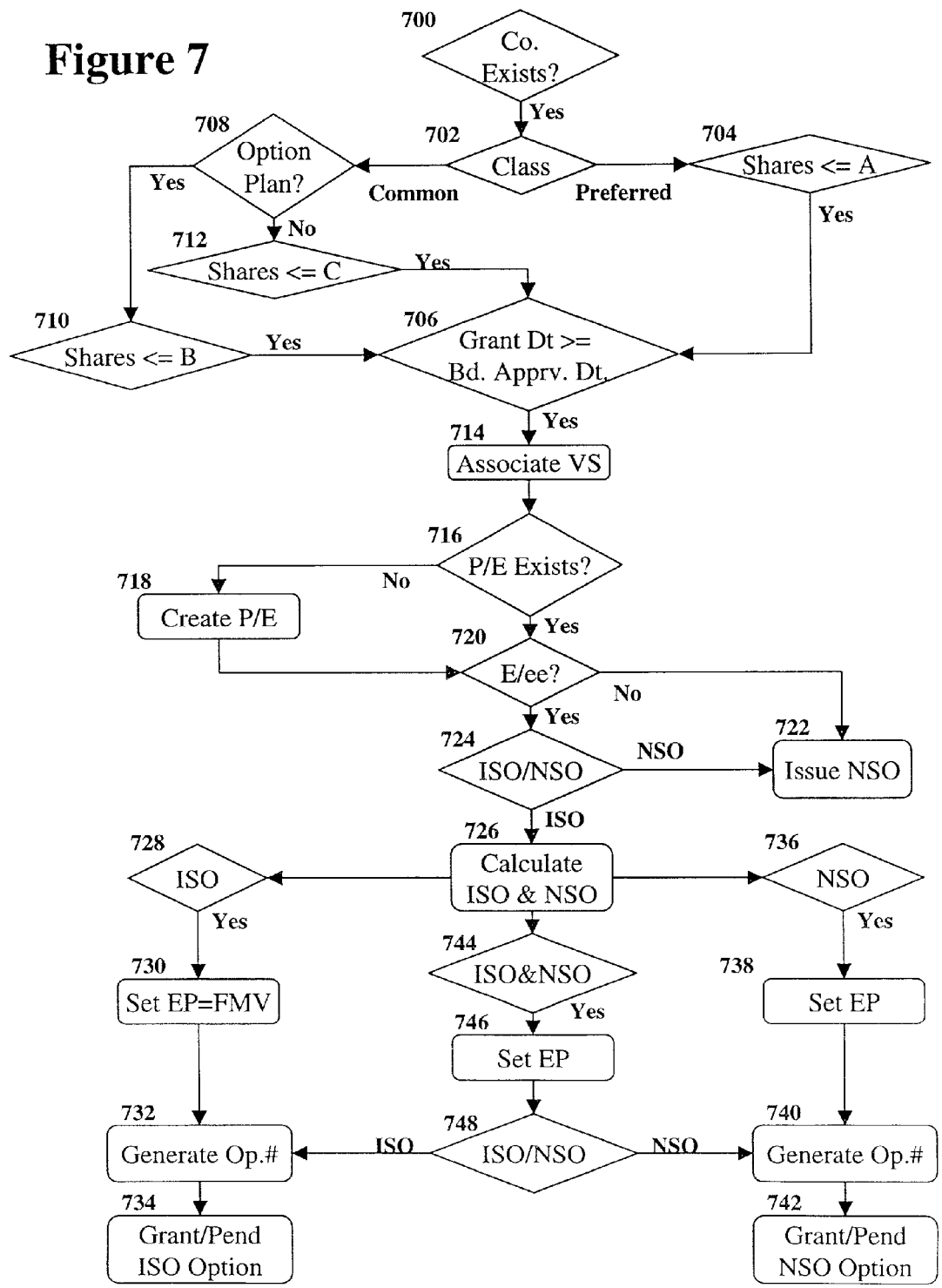
FIG. 7 illustrates in a flowchart the method for granting a stock option under the system.

In one embodiment, the database administration system 302 could perform a variety of managerial functions on the securities. To grant a security, for example an option, in one embodiment the database administration application 322 follows the procedure illustrated in the flowchart in FIG. 7. As shown in FIG. 7, the database is checked to see if the company in question has a corporate identifier entry 700. If the corporate identifier entry does not exist, one is made to represent that company. Next, the class of the option to be granted is determined 702. If the stock is preferred and the number of shares are less than or equal to the series capitalization minus the number of issued shares, issued warrants and granted options that are not cancelled (this calculation is hereinafter A) 704, then the option is granted if the board has approved it 706. If the stock is common, then the application checks the database to see if an option plan exists 708. If the, option plan exists and the number of shares is less than or equal to the planned capitalization minus the number of granted SPRs and options that are not cancelled or recyclable (this calculation is hereinafter B) 710, then the option is granted if the board has approved it 706. If the option plan does not exist and the number of shares is less than or equal to the total common stock minus the total of the common stock issued and outstanding, shares remaining in the plan, option plan outstanding, stock purchase plans (SPP) available, warrants available, non-plan options outstanding, and the different series and undesignated shares (this calculation is hereinafter C) 712, then the option is granted if the board has approved it 706. Next, a vesting schedule is associated with the type of option 714. The application then searches the database to see if the person or entity (P/E) has been created within the database 716. If not, a record for that person is created within the database 718. Then the application determines if the person to receive the option is an employee (E/ee) 720. If the person is not an employee, then a non-qualified stock option (NSO) is issued 722. If the person is an employee, then the option to be granted is classified as either a non-qualified stock option (NSO) or an incentive stock option (ISO) as specified by the board minutes 724. If the option is an ISO, then a calculation is performed to ensure that the aggregate fair market value of the shares which are exercisable for the first time during any calendar year does not exceed $100,000 in value, or whatever the statutory amount is at the time 726. Any shares exceeding the $100,000 limitation are treated as an NSO. If the options are ISO only 728, then the exercise price (EP) is set to the fair market value (FMV) 730. An option number is generated 732, and the ISO is granted or pending 734. If the option is an NSO, then an NSO is issued 722. If the options are NSO only 736, then the EP is set according to state law 738. An option number is generated 740, and the NSO option is granted or pending 742. If the options are ISO and NSO 744, then the exercise price EP is set according to state law 746. If the option has been separated into ISO and NSO based on the $100,000 value limitation described above 748, then two option numbers are generated 732 and 740, and the ISO and NSO option are granted or placed in pending status 734 and 742.

In other legacy databases, the user would have to run a report to find out if any ISO exceeds the $100,000 limitation, and the user then would have to manually divide the offending grant between an ISO and an NSO. The system does this grant division for the user automatically, thus eliminating the need to run extra reports and obviating the possibility of incorrectly granted ISO's. In a further embodiment, where the ISO exceeds the limitation due to early exercise, the system will automatically allocate those ISO's in excess of the $100,000 statutory limit to be exercisable in the following calendar year.

Figure 8:
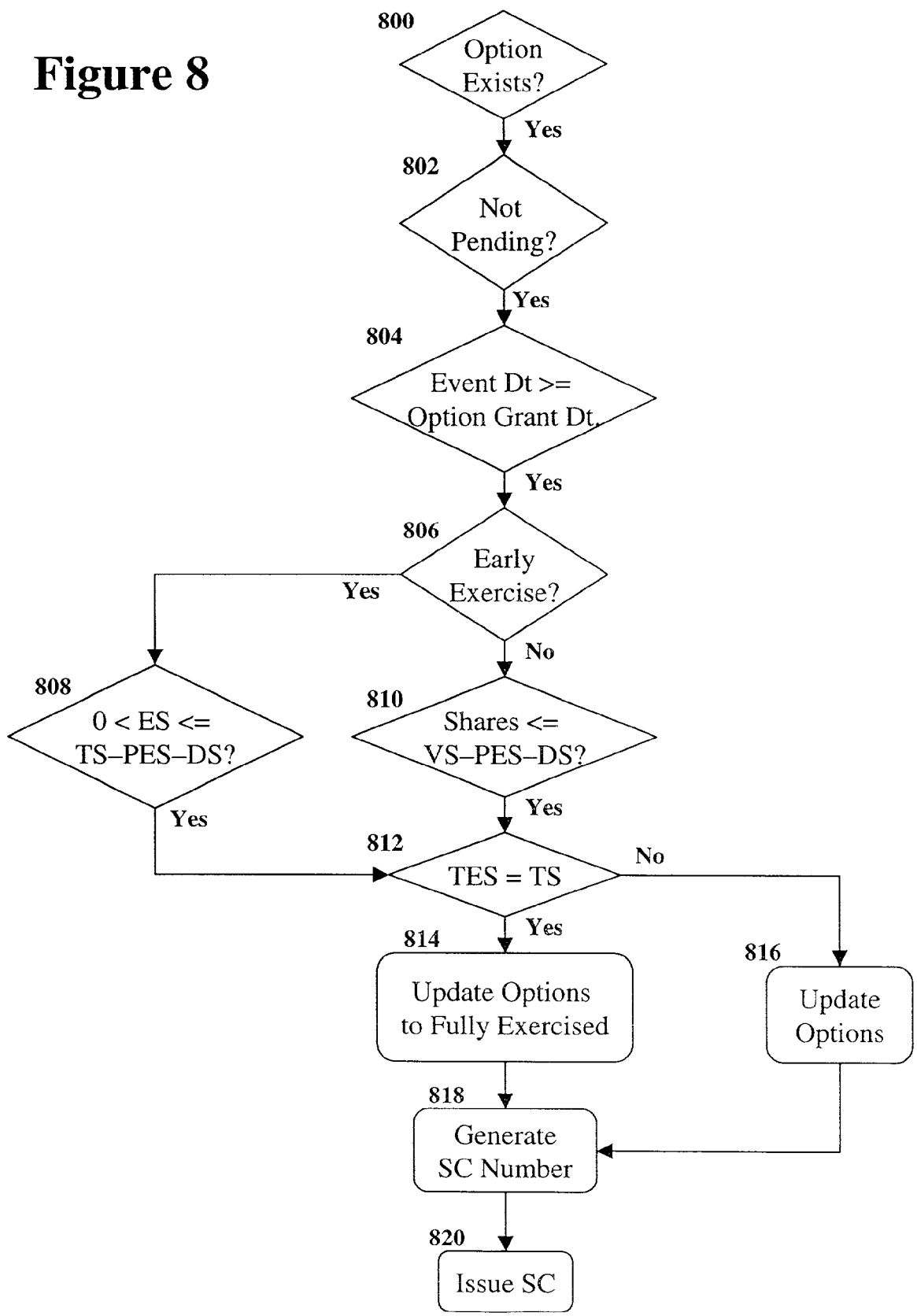
FIG. 8 illustrates in a flowchart the method for exercising a stock option under the system.

A second function performed by the database administration system 302, in one embodiment, is allowing a derivative security holder to exercise an option, SPR, CPN, or a warrant. For example, exercising an option would follow the method illustrated in the flowchart of FIG. 8. Referring to FIG. 8, the database 324 is checked to see if the option exists within the system 800. If the option exists and is not pending 802, the application 322 determines that the option could be exercised 804. Next, the application 322 determines if the option has an early exercise feature 806. If the option has this feature, then the application 322 checks whether the number of shares to be exercised is greater than zero and less than or equal to the total shares (TS) minus the previously exercised shares (PES) and the shares already cancelled or expired, i.e. "dead" shares (DS) 808. If the exercise of the options is not early, then the total number of shares is checked to see if that number is less than or equal to the number of vested shares (VS) minus the PES and minus the DS 810. If the total shares exercised including those currently being exercised are equal to the total number of shares 812, then the options are updated to signify that the options have been fully exercised 814. Otherwise, if the total shares exercised are not equal to the total number of shares 812, then the number of options exercised is updated 816. A stock certificate number is generated 818 and the stock certificate is issued 820.

Figure 9:
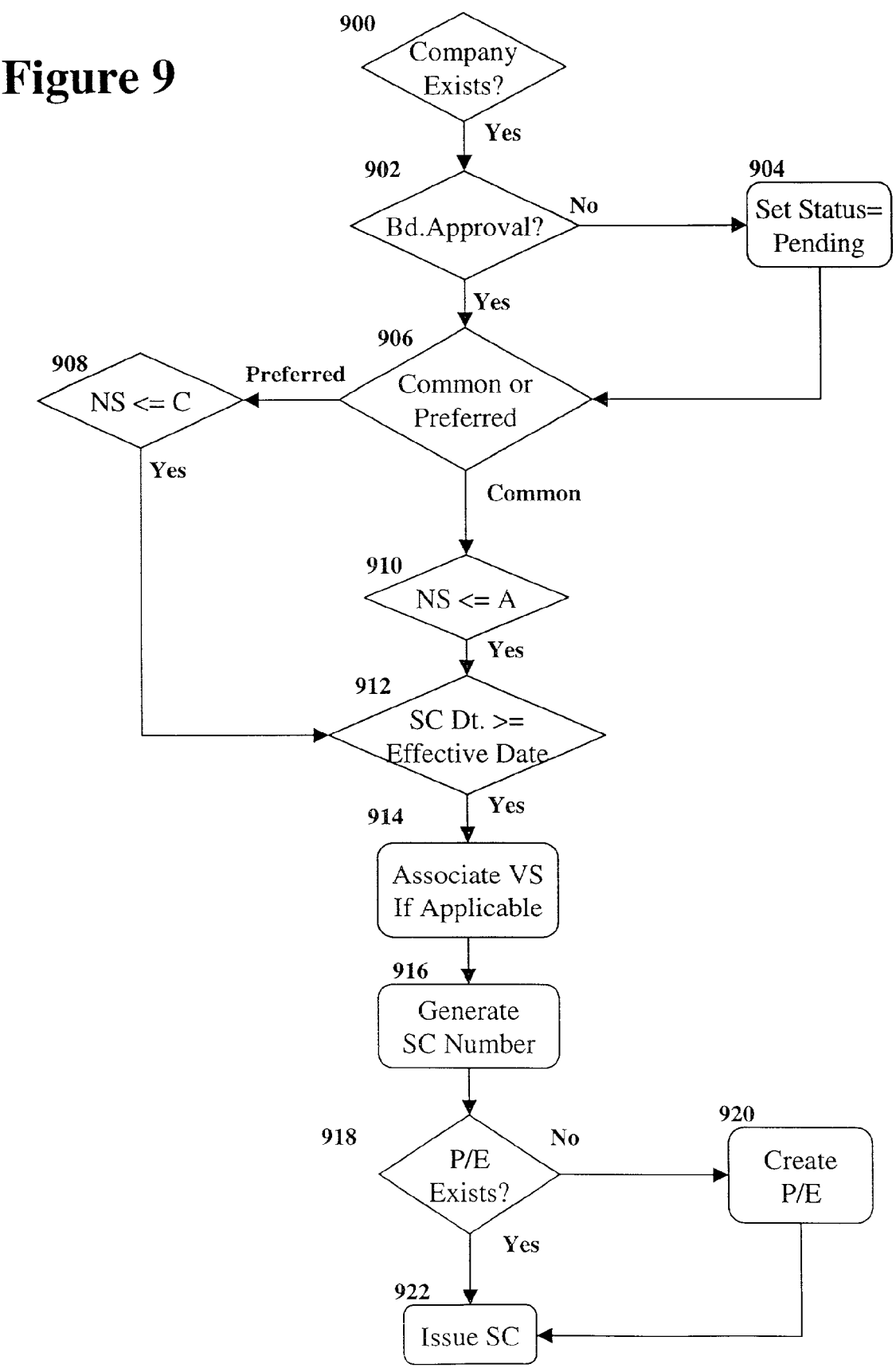
FIG. 9 illustrates in a flowchart the method for issuing a stock certificate under the system.

In one embodiment, a third function performed by the database administration system 302 is issuing actual stock certificates, following the method illustrated by the flowchart in FIG. 9. Referring to FIG. 9, the database 324 is checked to see if the company exists within the system 900. Then the system determines if the board has approved issuing the stock 902. If the board has not approved, the stock's status is set at pending 904. Next, the class of the stock is set at either common or preferred 906. If the stock is preferred, the number of shares of new stock must be less than or equal to the number calculated to be C in FIG. 7 908. If the stock is common, the number of shares of new stock must be less than or equal to the number calculated to be A in FIG. 7 910. The effective date of the stock certificate is then determined 912. A vesting schedule is associated with the stock if applicable to the situation 914 and a stock certificate (SC) number is generated 916. The application then checks the database to see if the person or entity (P/E) already exists within the system 918, and if not, creates one 920. Finally, the stock certificate is issued 922. In one embodiment, the legends on the issuing certificate are spell checked. The system tracks the location where the certificate was printed and the current holder of the certificate.

In one embodiment, the service provider operating the system of the present invention would also issue stocks granted directly to an investor. In an embodiment in which the company is publicly held, the derivative security holder is put in contact with a transfer agent in charge of issuing the stock. In an alternate embodiment, the database administrator or the database administrating system 322 alerts the transfer agent directly to issue a stock for the identified option holder. If the option holder wishes to perform a same day sale, in other words exercise the option and sell the resulting stock in the same transaction, the database administration program 322 can, in one embodiment, provide the holder with a choice of brokers with whom to execute their trade. Any of the above actions can be performed either over the web via database administration software 322 or by direct contact with a personal service representative working for the service provider.

In another embodiment, the system 322 can allow for a tighter control of the many securities transactions performed by the company. For each security, the system 322 can track board of directors approval status of proposed transactions. The company can then view actual and pro-forma reports affected by such transactions. The system 322 allows the company to undo, or "roll back", specific transactions enabling the company to undo a transaction of securities or derivative securities. "Rolling back" differs from cancellation, which can also be made available to the company, in the amount of time between when the security or derivative security is granted and when the security or derivative security is taken back. In another embodiment, the price at which the security was issued is compared with the company's share price at the time, identifying those securities issued below a reasonable price.

In one embodiment, the application 322 can also administer a stock-split. A stock-split is the act of changing the portion of the company that each share of stock represents. The proportion of the value of the company owned by the holder remains the same, but the total number of shares owned by the holder changes, as does the purchase of price of the shares. In a forward split, the company decreases the portion of ownership that each share represents, requiring the company to issue new shares to all shareholders to represent ownership of the same portion of stock. In a reverse split, the company increases the portion that each share represents, requiring the company to modify or cancel all the existing stock certificates and then issue new certificates to all the shareholders for fewer shares. To implement either kind of split, the company also modifies all of its options, SPRs, and warrants to represent a new number of shares—more shares for a forward split, fewer shares for a reverse split. The number of authorized shares in each option plan changes the same way. CPNs remain unaffected until the note is converted.

Figure 10:
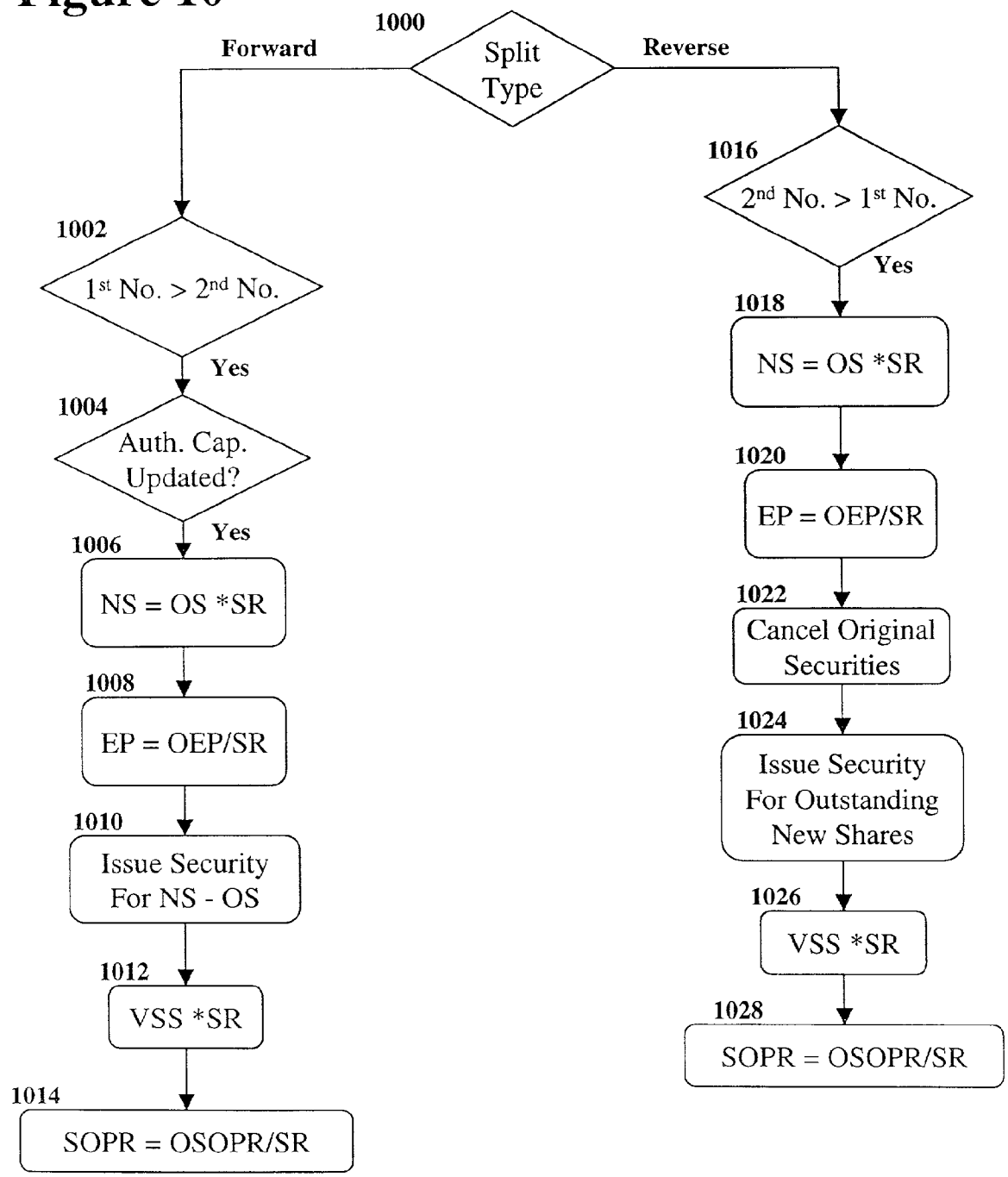
FIG. 10 illustrates in a flowchart the method for performing a stock-split.

In one embodiment, the system 322 would perform a stock-split following the method illustrated in FIG. 10. First, the system would follow the company's directives mandating the type of split 1000. If the split is a forward split, the first number in the split ratio (SR) must be greater than the second number in the split ratio 1002. A message is then sent to the user asking "Authorized Capital Updated?" 1004. Next the new total number of shares (NS) is set equal to the old number of shares (OS) times the SR 1006. Fractional shares are rounded applying a rounding method linked to the security type. The exercise price (EP) for options, SPRs and warrants are set equal to the old exercise price OEP divided by the SR 1008. New securities are issued for the balance number of the shares that are outstanding 1010. The balance number is equal to NS minus OS. The vesting schedule share (VSS) numbers are multiplied by the split ratio 1012. The stock/option plan reserve (SOPR) is set equal to the old reserve (OSOPR) multiplied by the SR 1014.

If the split type is a reverse split, the second number in the SR must be greater than the first number in the split ratio 1016. Next the new total NS is set equal to the OS times the SR 1018. Fractional shares are rounded applying a rounding method linked to the security type. The EP for options, SPRs and warrants are set equal to the old exercise price OEP divided by the SR 1020. The original securities comprising issued stock are cancelled 1022. New securities are issued for the new number of shares that is outstanding 1024. For options, SPR's, and warrants, the vesting schedule share numbers are multiplied by the split ratio 1026. The SOPR is set equal to the OSOPR divided by the SR 1028.

In one embodiment, a reconciliation report is generated to allow reconciliation of every share or fraction of a share before and after a split. In an alternative embodiment, after a stock-split has taken place, a pre-split transaction can be entered retroactively. The retroactive entry allows the transaction to be processed as if the transaction was entered before the stock-split took place.

In one embodiment, the database administration system 302 facilitates the administration of a company's capitalization structure by tracking and gathering data on the capitalization structure. In a further embodiment, the system can give a warning to user companies when the remaining shares in the option plan pool reaches a specified level.

In one embodiment, the data being tracked would relate to the entry of data into the database 324. In each instance of a user entering data regarding a transaction or modifying data regarding a transaction, the name of that user and the time that the data was entered or modified is automatically noted by the system. In an alternate embodiment, if the user contacts a CSS 318 in order to have the CSS make the desired entries or modifications, the system will automatically note the name of that CSS and the time the data was entered or modified. The system can then produce a report detailing what entries and modifications have been made by whom and when as of the date the report was generated.

The data stored in the database 324 can also include other company information, while not directly stock related, which further facilitates the management of the company's capital structure. For example, this additional data would include information related to corporate governance. Corporate governance information includes corporate charter documents, such as articles of incorporation and bylaws. Tracking of foreign qualifications retained in database 324 would also be data useful to the proper management of the company's capitalization structure.

In a further embodiment, the system 322 tracks any changes in control of the company that occur. A "change of control" of the company usually occurs upon an acquisition or merger, and may accelerate the vesting of securities. Tracking this attribute can easily supply a company with an accurate list of security holders to whom this applies, and affords the user an easier means of conversion and acceleration of those securities.

Another embodiment allows the companies to track a holder of a right of first offer (ROFO). A "right of first offer" affords a security holder a means of preventing anti-dilution of his/her ownership percentage in a company by giving him/her the right to participate (on a pro rata or otherwise previously agreed upon basis) in any future offerings or sales or the company's stock with certain exceptions. When a company is conducting a sale of its securities, all ROFO holders should be notified of the sale so that such holders may either waive their rights or participate in the sale.

In an additional embodiment, the system can track a holder of a right of first refusal (ROFR). A "right of first refusal" gives the company preference on any stock that a shareholder may want to sell. The system will not only track the attribute using a "Yes" or "No" response, but will also enable the user to alert the company of the company's repurchase rights and apprise the company of the time period within which such repurchase can occur. This "triggering" device will help the company to not miss any of its opportunities to reacquire the company's own shares.

Figure 11:
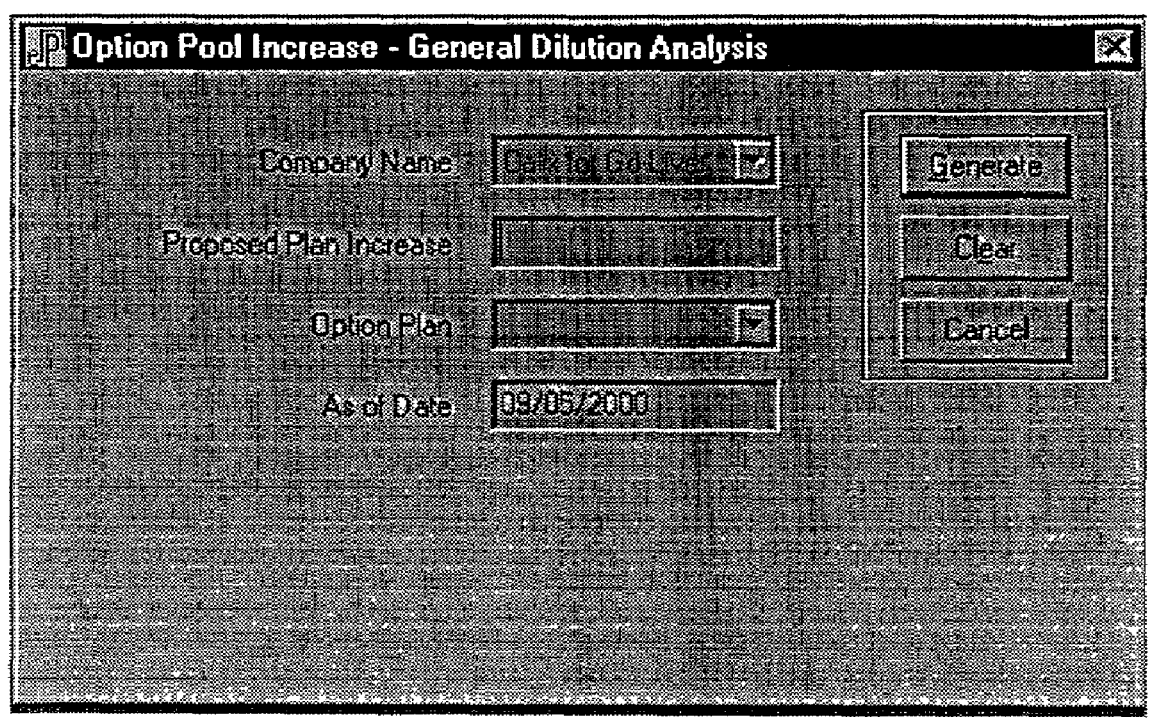
FIG. 11 is a user interface for inputting data to generate a "What if" report.

The database administration system 302 of the present invention can also use the data stored in the database 324 to make projections about possible future actions of the company, called "What If" information. These "What If" reports can use a planned future action of the company and, taking into account the current capitalization structure of the company, determine the results of those actions. These planned future actions could be entered via the web interface, shown in FIG. 11. Some of these planned future actions include proposed financings, option pool increases, dilution analysis, valuation step-up analysis, share price analysis, pro-rata investment analysis, and new share issuance analysis. In a further embodiment, other reports are available to the company, such as stock reports, option reports, transactional activities, management reports on option pool budget, variance analyses, and other analysis tools. In one embodiment, these reports can be accessed via the web by the company, or by accounting professionals and the venture capital community. In an embodiment for public companies, the system can calculate the earnings per share, using data about the option shares, the employee stock purchase plan shares, and other share information retrieved from the transfer agent. Custom notes can be added to these reports as required. In an additional embodiment, individuals and entities are grouped together logically.

An example of a "What If" report would be a report determining the viability of granting a new set of options to a set of employees. The database administration application 322 would analyze the current set of outstanding options, as well as the options already exercised and the shares still available to be granted. The application would then compute the effect that a new set of options would have on the overall capitalization, generating an analysis of the effect in report form.

In one embodiment, the system can also manage and analyze the compensation available to different executives or employees in the company. In this compensation management tool, each executive or employee is separated by job classification. In an alternate embodiment, this classification is further broken down to include experience and education. Attached to each job classification are the equity packages each executive or employee receives. This equity compensation information would be culled from the system's database.

In an additional embodiment, the compensation management tool can monitor cash compensation, such as salaries and bonuses. The executives or employees being compensated would voluntarily provide this information. In an alternative embodiment, the system would have a direct real-time connection to the company's payroll system or enterprise resource planning (ERP) system.

In one embodiment, the system would use this compensation information to perform analysis and produce reports based on that data. In addition to job position, the compensation could be further categorized as to the industry the company practices in, the geographical location of the company, and the developmental stage of the company. These reports, in one embodiment, would be presented as charts and graphs. A user, such as the company, a venture capitalist, a human resources executive, or a job seeker, could view this to analyze the company's compensation structure or to analyze how the company's compensation model compares with others in the company's market segment. In one embodiment, this would be viewed through web access or ASP software.

In one embodiment, the system 302 can also use the data about the capitalization structures to analyze compliance with legal requirements. The legal requirement, in one embodiment, could be Rule 701, which exempts certain kinds of employee compensation, in the form of securities or derivative securities, from registration under the Securities Act of 1933. In a further embodiment, the Rule 701 test computation can be run in "real-time" or in batch. Additionally, in one embodiment, the test can be run in either update or read only mode. In an alternate embodiment, the system will automatically associate the Rule 701 federal exemption to each compliant security.

Figure 12:
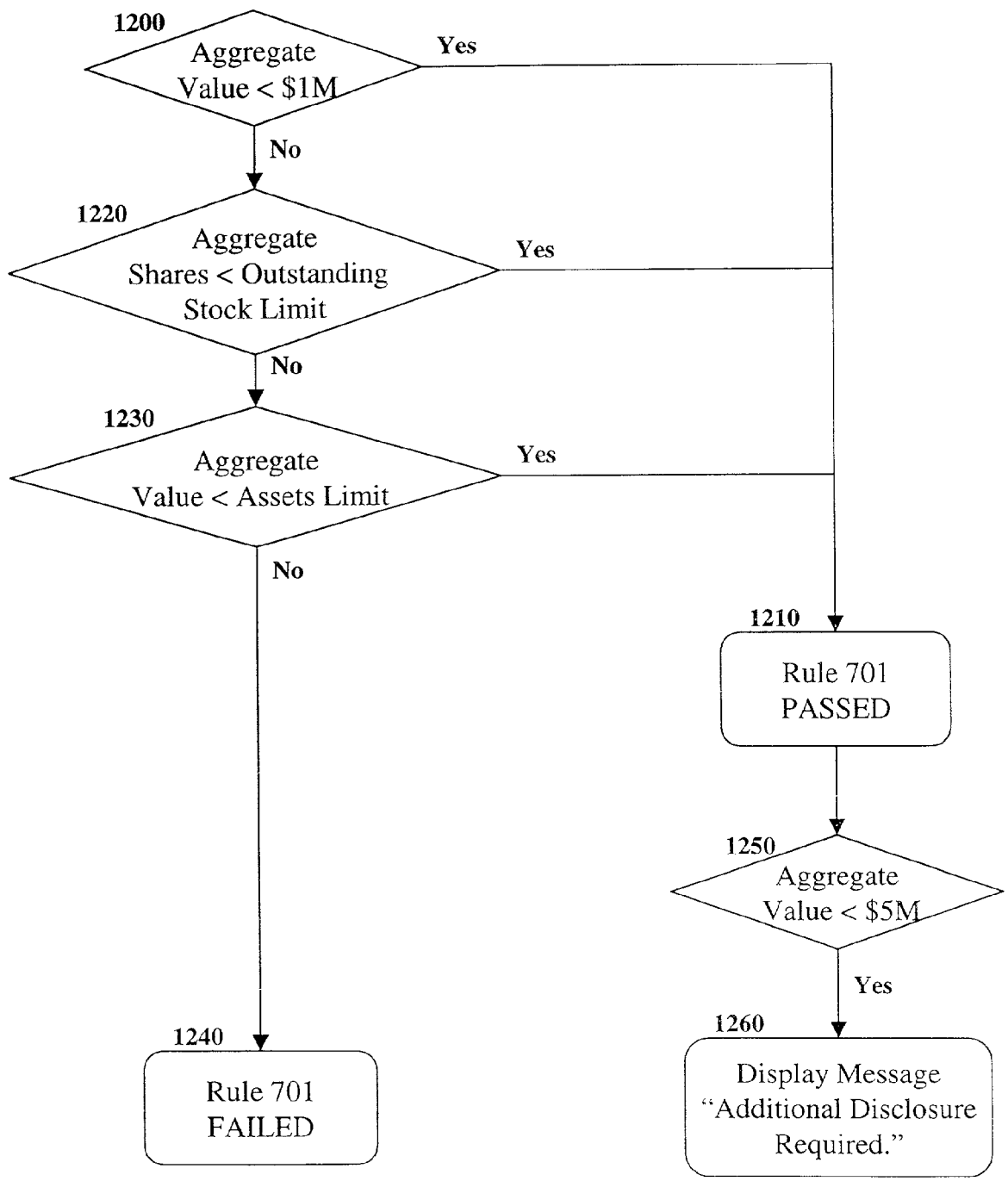
FIG. 12 illustrates in a flowchart the method for performing a Rule 701 calculation.

In deciding if a security meets Rule 701, in one embodiment, the database administration system 302 follows the method illustrated in FIG. 12. The initial question is whether the aggregate dollar value of the Rule 701 shares is less than $1 million 1200. If the aggregate dollar value is less than one million, then the security passes Rule 701 1210. The aggregate dollar value of the Rule 701 shares are determined by adding the dollar value of existing securities (option grants, SPR grants, warrants and common stock) at active status in the 12 months prior to the calculation date and the dollar value of new securities, or compensatory securities without federal exemptions assigned, as of the calculation date. If the aggregate dollar value is greater than one million, the question is whether the aggregate number of Rule 701 shares is less than the outstanding stock limit 1220, in which case the security will pass Rule 701. The outstanding stock limit is 15% of the outstanding stock. The aggregate number of Rule 701 shares equals the existing shares at active status in the twelve months prior to the calculation date plus the new securities as of the calculation date. The next question, if the aggregate shares are not less than the outstanding stock limit, is whether the aggregate dollar value of Rule 701 shares is less than the asset limit 1230. The assets limit is 15% of the total assets, comprising the dollar amount of company assets from the most recent balance sheet. If the aggregate value is less than the assets limit, then the security failed Rule 701 1240. Once a security has passed Rule 701 1210, if the aggregate dollar value of the Rule 701 shares is less than $5 million 1250, then additional disclosure is required 1260.

In a different embodiment, the system 322 can automatically make an electronic filing of an 83(b) election with the IRS. A shareholder may file a "Section 83(b) Election" with the IRS upon purchase of shares with a potential for forfeiture This "potential for forfeiture" usually occurs due to shares having a vesting schedule, with the unvested shares being subject to repurchase by the company under certain circumstances. The 83(b) filing is very time sensitive; it must be filed with the IRS no later than 30 days from the date the shares are acquired (a postmark by the $30^{th}$ day is sufficient for the IRS). By making this filing, the shareholder elects to have the shares taxed at their current fair market value (FMV) versus the price paid for the shares. Usually, this taxable "spread" is-zero at the time of the filing. If this filing is not made on a timely basis, the shareholder is subject to potentially large tax liability if the spread between the price paid for the shares and the FMV of the shares ever increases. By tracking this on the system, the company can be appraised if and/or when the shareholder has made this election.

In an alternative embodiment, the system can automatically track security transactions of reporting persons once the stock is publicly traded. In a further embodiment, the system tracks the Rule 144 start date, which will greatly assist with "overhang analysis". Overhang analysis is concerned with which stocks are publicly tradable and the time at which they become tradable. In another embodiment, the system further facilitates overhang analysis by tracking shareholders with registration rights and tracking the lock-up period for unregistered securities. Upon the completion of an initial public offering (IPO), stocks that are registered with the Securities and Exchange Commission (SEC) become freely tradable. Securities issued pre-IPO are usually not registered and are "locked-up", or unable to be sold, typically for a period of 180 days. If the shareholder has registration rights, he/she can ask that his/her shares be registered during the IPO, allowing them to become freely tradable prior to the expiration of the lock-up period.

Thus, an Internet/Web based software application system to organize and manage corporate capitalization and securities is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A computer-implemented method for facilitating comprehensive and integrated classification, administration and tracking of a company's capitalization structure, the method comprising:

initiating a capitalization structure affecting request using an input device by a person, wherein the capitalization structure affecting request is a requested change to the company's equity ownership structure, and the person includes an individual acting on behalf of the person or an entity;

automatically determining a vesting schedule particular for the person in response to the capitalization structure affecting request using an administration software in communication with the input device, wherein automatically determining the vesting schedule includes:

accessing company restrictions relating to the capitalization structure affecting request from a database in communication with the administration software;

accessing a record of the person relating to the capitalization structure affecting request from the database;

accessing governmental restrictions relating to the capitalization structure affecting request and the record from the database;

automatically uniquely classifying the capitalization structure affecting request with respect to the person based on the accessed company restrictions, accessed record, and accessed governmental restrictions using the administration software;

wherein the automatically determined vesting schedule is the actual fulfillment of the capitalization structure affecting request;

automatically updating the record of the person stored at the database in accordance with the automatically determined vesting schedule; and automatically updating the company's equity ownership structure stored at the database in accordance with the automatically determined vesting schedule, the company's equity ownership structure stored at the database representative of the company's complete equity ownership structure, including the ways the company is funded and the associated ownership by employees, investors, and lenders.

2. The computer-implemented method of claim 1, wherein the capitalization structure affecting request is at least one of exercise, transfer, purchase, sale, authorization, recapitalization, split, termination, tolling, cancellation, and conversion of a company security.

3. The computer-implemented method of claim 1, wherein the capitalization structure affecting request is a hypothetical "what-if" capitalization-affecting activity.

4. The computer-implemented method of claim 1, further comprising:
   generating a report representative of the company's capitalization structure, at least a portion of a balance sheet, or at least a portion of a tax return from data stored in the database.

5. The computer-implemented method of claim 4, wherein generating a report includes generating a report representative of a present, revised, or hypothetical capitalization structure, at least a portion of a balance sheet, or at least a portion of a tax return.

6. The computer-implemented method of claim 1, wherein the company restrictions include approval status of a board of directors for the company with regard to a capitalization structure of the company.

7. The computer-implemented method of claim 1, wherein initiating a capitalization structure affecting request includes interfacing with the administration software by at least one of the Internet or an area network.

8. The computer-implemented method of claim 1, further comprising interfacing with a transfer agent or equity plan administrator when the classified capitalization structure affecting request has been granted.

9. The computer-implemented method of claim 1, wherein the person is at least one of an employee, investor, and lender.

10. The computer-implemented method of claim 1, wherein initiating a capitalization structure affecting request on behalf of a person includes initiating by at least one of a company agent, a company administrator, and an authorized agent.

11. A computerized system for integrated classification, administration, and tracking of a company's equity ownership structure, including identification of the equity owners and their respective rights of ownership, the system comprising:
   a device configured to transmit a security transaction request from a user wherein the security transaction request affects the company's equity ownership structure, and the user includes an individual acting on behalf of the user or an entity;
   a database comprising data relating to an equity ownership structure of a company, company restrictions relating to the security transaction request, a record regarding the user, and governmental restrictions relating to the security transaction request, the record regarding the user including data relating to an employment status of the user with the company and execution status of previous security transaction requests by the user;
   a database administration software in communication with the database and the device;
   wherein the equity ownership structure of the company stored in the database is representative of the company's complete equity ownership structure, including the ways the company is funded and the associated ownership by employees, investors, and lenders;
   wherein the database administration software is configured to automatically calculate a unique vesting schedule for the user in response to the security transaction request in accordance with the company restrictions, record regarding the user, and governmental restrictions, wherein the unique vesting schedule is the actual fulfillment of the security transaction request, wherein the unique vesting schedule can differ from a vesting schedule for the same security transaction request made by a different user, on behalf of the different user, or at a different point in time, and wherein the equity ownership structure of the company stored in the database is automatically updated in accordance with the unique vesting schedule.

12. The system of claim 11, wherein the database administration software is further configured to automatically update the record regarding the user upon calculation of the vesting schedule.

13. The system of claim 11, wherein the device communicates with the database administration software via at least one of the Internet and a network.

14. The system of claim 11, wherein the user is selected from a group including an investor, lender, and employee.

15. The system of claim 11, wherein the user is limited in the types of permitted security transaction requests based on the user's position with the company and the user's authorized transactions.

16. The system of claim 11, further comprising a customized user interface in communication with the database administration software.

17. The system of claim 16, wherein the customized user interface is configured to include a payment screen to pay and track payment particulars relating to the security transaction request.

18. The system of claim 11, wherein the security transaction request relates to at least one of stock, restricted stock, stock purchase rights, options, warrants, convertible promissory notes, and other equity-based financial instruments.

19. The system of claim 11, wherein the company restrictions include the company's board approvals regarding the company's securities.

20. The system of claim 11, wherein the administration software is configured to generate a report including changes to the company's equity ownership structure from the security transaction request.

21. The system of claim 11, wherein the administration software is configured to provide a granted or pending status for the security transaction request.

22. A computer-implemented method for facilitating comprehensive and integrated classification, administration, and tracking of a company's capitalization structure, the method comprising:
   initiating a capitalization structure affecting request using an input device by a person, wherein the capitalization structure affecting request is a requested change to the company's equity ownership structure excluding ownership from stock options, the person includes an individual acting on behalf of the person or an entity, and the person is at least one of an investor and lender;
   automatically determining a vesting schedule particular for the person in response to the capitalization structure affecting request using an administration software in communication with the input device, wherein automatically determining the vesting schedule includes:

accessing company restrictions relating to the capitalization structure affecting request from a database in communication with the administration software;

accessing a record of the person relating to the capitalization structure affecting request from the database;

accessing governmental restrictions relating to the capitalization structure affecting request and the record from the database;

automatically uniquely classifying the capitalization structure affecting request with respect to the person based on the accessed company restrictions, accessed record, and accessed governmental restrictions using the administration software;

wherein the automatically determined vesting schedule is the actual fulfillment of the capitalization structure affecting request;

automatically updating the record of the person stored at the database in accordance with the automatically determined vesting schedule; and automatically updating the company's equity ownership structure stored at the database in accordance with the automatically determined vesting schedule.

23. The computer-implemented method of claim 22, wherein the capitalization structure affecting request is at least one of exercise, transfer, purchase, sale, authorization, recapitalization, split, termination, tolling, cancellation, and conversion of a company security.

24. The computer-implemented method of claim 22, wherein the capitalization structure affecting request is a hypothetical "what-if" capitalization-affecting activity.

25. The computer-implemented method of claim 22, further comprising:

generating a report representative of the company's capitalization structure, at least a portion of a balance sheet, or at least a portion of a tax return from data stored in the database.

26. The computer-implemented method of claim 25, wherein generating a report includes generating a report representative of a present, revised, or hypothetical capitalization structure, at least a portion of a balance sheet, or at least a portion of a tax return.

27. The computer-implemented method of claim 22, wherein the company restrictions include approval status of a board of directors for the company with regard to a capitalization structure of the company.

28. The computer-implemented method of claim 22, wherein initialing a capitalization structure affecting request includes interfacing with the administration software by at least one of the Internet or an area network.

29. The computer-implemented method of claim 22, further comprising interfacing with a transfer agent or equity plan administrator when the classified capitalization structure affecting request has been granted.

30. The computer-implemented method of claim 22, wherein initiating a capitalization structure affecting request on behalf of a person includes initiating by at least one of a company agent, a company administrator, and an authorized agent.

31. A computerized system for integrated classification, administration, and tracking of a company's equity ownership structure, including identification of the equity owners and their respective rights of ownership, the system comprising:

a device configured to transmit a security transaction request from a user, wherein the security transaction request affects the company's equity ownership structure, the security transaction request does not relate to stock options, the user includes on individual acting on behalf of the person or an entity, and the user is at least one of an investor and lender;

a database comprising data relating to an equity ownership structure of a company, company restrictions relating to the security transaction request, a record regarding the user, and governmental restrictions relating to the security transaction request, the record regarding the user including data relating to an employment status of the user with the company and execution status of previous security transaction requests by the user; and a database administration software in communication with the database and the device;

wherein the database administration software is configured to automatically calculate a unique vesting schedule for the user in response to the security transaction request in accordance with the company restrictions, record regarding the user, and governmental restrictions, wherein the unique vesting schedule is the actual fulfillment of the security transaction request, wherein the unique vesting schedule can differ from a vesting schedule for the same security transaction request made by a different user, on behalf of the different user, or at a different point in time, and wherein the equity ownership structure of the company stored in the database is automatically updated in accordance with the unique vesting schedule.

32. The system of claim 31, wherein the database administration software is further configured to automatically update the record regarding the user upon calculation of the vesting schedule.

33. The system of claim 31, wherein the device communicates with the database administration software via at least one of the Internet and a network.

34. The system of claim 31, wherein the user is limited in the types of permitted security transaction requests based on the user's position with the company and the user's authorized transactions.

35. The system of claim 31, further comprising a customized user interface in communication with the database administration software.

36. The system of claim 35, wherein the customized user interface is configured to include a payment screen to pay and track payment particulars relating to the security transaction request.

37. The system of claim 31, wherein the security transaction request relates to at least one of stock, restricted stock, stock purchase rights, options, warrants, convertible promissory notes, and other equity-based financial instruments.

38. The system of claim 31, wherein the company restrictions include the company's board approvals regarding the company's securities.

39. The system of claim 31, wherein the administration software is configured to generate a report including changes to the company's equity ownership structure from the security transaction request.

40. The system of claim 31, wherein the administration software is configured to provide a granted or pending status for the security transaction request.

* * * * *